T. JONES.
Method of Ornamenting Glass.
No. 159,418.  Patented Feb. 2, 1875.
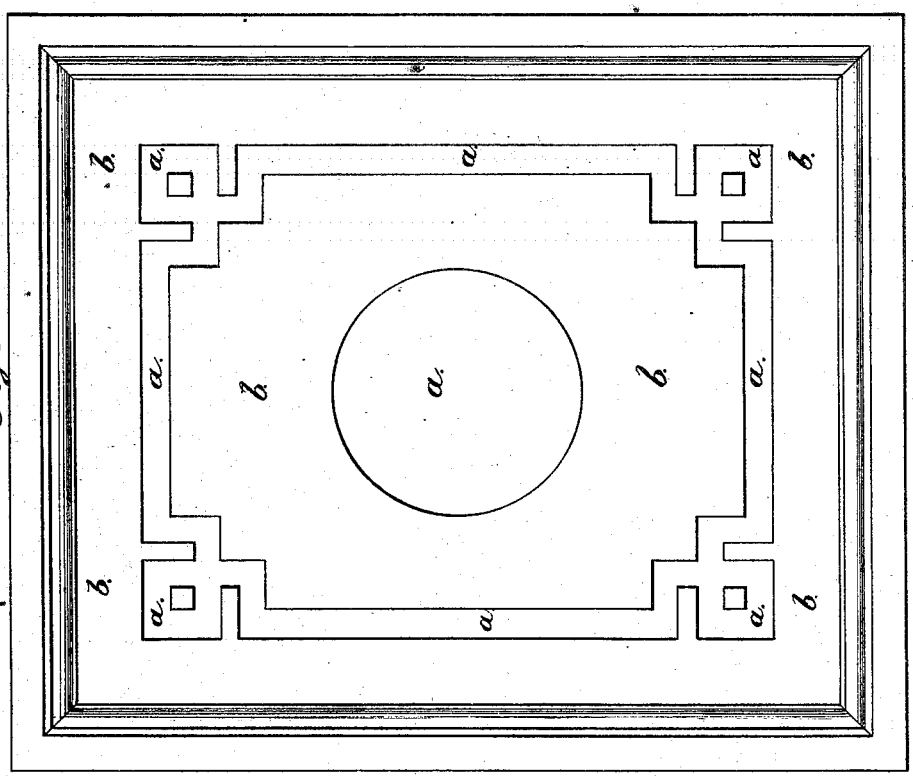

UNITED STATES PATENT OFFICE.

THOMAS JONES, OF NEW YORK, N. Y.

IMPROVEMENT IN METHODS OF ORNAMENTING GLASS.

Specification forming part of Letters Patent No. 159,418, dated February 2, 1875; application filed December 3, 1874.

*To all whom it may concern:*

Be it known that I, THOMAS JONES, of New York city, State of New York, have invented an Improvement in the Ornamentation of Glass Plates and other glass articles, of which the following is a specification:

The object of my invention is to produce silvered or gilt designs on glass plates, dishes, or other articles of glassware, so as to appear in bold relief; and it consists in the following-described process, to wit: First, I take a sheet or plate of glass, or other glass article, already having a deadened surface, and rendered opaque, or I prepare the same by grinding, frosting, or roughening, by the sand-blast, etching, or other well-known means, one surface or side thereof. I then cut or otherwise engrave upon the side so roughened or ground any desired design, and then thoroughly polish the sunken surfaces produced by such engraving. I then silver or gild, by the application of metallic leaf, electro-deposit, or other means practiced and known in the manufacture of looking-glasses, the whole roughened and cut side of the plate, the effect of which will be to render the engraved and transparent portions representing the design not alone reflecting, but, when viewed from the front or opposite side of the plate, apparently in high relief. Paint or other suitable protecting material may then be applied to the silvered glass to prevent the silver coating from being rubbed off or otherwise injured.

In the accompanying drawing, I have represented a glass panel ornamented in accordance with my invention, wherein—

Figure 1 is a front view, and Fig. 2 is a vertical section, the engraved, silvered, and reflective portions being indicated by the letters *a a a*, and the deadened or opaque portions by *b b b*.

It is obvious that my invention is capable of application in the production of ornamental signs, door-plates, &c., as well as what I have herein particularly mentioned.

I am aware that ground glass has been engraved, and also that ornamental designs in the way of borders, and in apparent relief, have been produced on the surfaces of looking-glasses; but I am not aware that such have been produced on glass plates or other glass articles previously rendered opaque by grinding, or other suitable means, before my said invention.

What I claim therefore as new, and which I desire to secure by Letters Patent, is—

1. The described process of ornamenting glass plates, dishes, and other glass articles, consisting essentially of first obtaining or producing a deadened surface to render them non-transparent, then cutting or otherwise engraving any desired design upon the previously ground or roughened surfaces thereof, then polishing the depressed or sunken portions produced by such engraving, and, finally, silvering or gilding all over the roughened and engraved surfaces, substantially as and for the purpose set forth.

2. A glass panel, having its under or inner side roughened, cut, polished, and silvered, substantially as described and shown.

THOS. JONES.

Witnesses:
ALBERT H. HOOK,
T. H. DARLINGTON.